United States Patent
Wu et al.

(10) Patent No.: US 9,578,134 B2
(45) Date of Patent: Feb. 21, 2017

(54) MOBILE HUB DEVICES AND DOCKING STATIONS FOR CONTROLLED DELIVERY OF DIGITAL MULTIMEDIA DATA

(71) Applicant: Enfora, Inc., Richardson, TX (US)

(72) Inventors: John Wu, San Diego, CA (US); John Jiang, San Diego, CA (US); Arup Bhattachara, San Diego, CA (US); Todd Conklin, San Diego, CA (US); Charlie Moore, Plano, TX (US); Tom Daugherty, Jr., Flower Mound, TX (US)

(73) Assignee: Enfora, Inc., San Diego, CA (US)

( * ) Notice: Subject to any disclaimer, the term of this patent is extended or adjusted under 35 U.S.C. 154(b) by 561 days.

(21) Appl. No.: 13/801,644

(22) Filed: Mar. 13, 2013

(65) Prior Publication Data

US 2014/0269523 A1  Sep. 18, 2014

(51) Int. Cl.
*H04L 12/28* (2006.01)
*H04L 29/08* (2006.01)
*G06F 1/16* (2006.01)
*H04W 4/18* (2009.01)

(52) U.S. Cl.
CPC ............ *H04L 67/34* (2013.01); *G06F 1/1632* (2013.01); *H04W 4/18* (2013.01)

(58) Field of Classification Search
None
See application file for complete search history.

(56) References Cited

U.S. PATENT DOCUMENTS

| | | | |
|---|---|---|---|
| 8,400,961 B1* | 3/2013 | Islam | H04W 8/24 370/328 |
| 2002/0010759 A1* | 1/2002 | Hitson et al. | 709/219 |
| 2007/0174471 A1* | 7/2007 | Van Rossum | 709/229 |
| 2009/0244402 A1* | 10/2009 | Rye et al. | 348/734 |
| 2010/0208634 A1* | 8/2010 | Eng et al. | 370/310 |
| 2012/0036220 A1* | 2/2012 | Dare et al. | 709/217 |
| 2013/0086633 A1* | 4/2013 | Schultz | 726/2 |
| 2014/0059623 A1* | 2/2014 | Hasenei | 725/85 |

* cited by examiner

*Primary Examiner* — Duc C Ho
(74) *Attorney, Agent, or Firm* — TechLaw LLP (57) ABSTRACT

Mobile hub devices and docking stations facilitate controlled delivery of digital multimedia data from a content service provider. A mobile hub device includes a transceiver configured to receive and transmit digital multimedia data over a plurality of communication links. The mobile hub device includes a processor for identifying content providers which permit the mobile hub device to download multimedia data hosted by the content providers. The processor schedules delivery of the multimedia data from the content providers to the mobile hub device.

32 Claims, 6 Drawing Sheets

MOBILE HUB DEVICES AND DOCKING STATIONS FOR CONTROLLED DELIVERY OF DIGITAL MULTIMEDIA DATA

TECHNICAL FIELD

Generally, the present disclosure relates to communication devices and methods and, more specifically, to mobile hub devices and docking stations for controlled delivery of digital multimedia data.

BACKGROUND

Smart phones, tablet computers, personal digital assistants (PDAs) and other handheld devices, collectively referred to as "user devices", are increasingly being used for downloading digital multimedia data. For example, movies, music and video games may be downloaded into a user device from a content service provider such as, for example, Amazon.com, Netflix and Best Buy. The content service providers may be accessed over the Internet to download the multimedia data. The downloaded multimedia data may be stored locally in a user device for later use.

Existing multimedia delivery platforms have several drawbacks. Existing delivery platforms provide a minimally controlled delivery network, do not allow automatic concurrent distribution of multimedia data to multiple user devices, and do not allow scheduled transfer of multimedia files to separate physical locations. Also, existing delivery platforms do not allow scheduled access to multimedia files to optimize network availability and to optimize rental and purchase restrictions that may be associated with the files.

Therefore, improved systems and methods are needed.

SUMMARY

Various disclosed embodiments provide mobile hub devices and docking stations for controlled delivery of digital multimedia data.

According to disclosed embodiments, a mobile hub device includes a transceiver configured to receive and transmit digital multimedia data over a plurality of communication links. The mobile hub device includes a storage device configured to store the multimedia data. A processor is operably coupled to the storage device. The processor identifies a content provider which permits the mobile hub device to download multimedia data hosted by the content provider and identifies one or more external devices permitted to receive the multimedia data from the mobile hub device. The processor schedules delivery of the multimedia data from the content provider to the mobile hub device and schedules delivery of the multimedia data from the mobile hub device to the external devices.

According to disclosed embodiments, the mobile hub device includes a high definition multimedia interface (HDMI) configured to transfer the multimedia data and also includes a universal serial bus (USE) configured to transfer the multimedia data.

According to disclosed embodiments, a method for downloading digital multimedia data by a mobile hub device includes establishing by the mobile hub device a communication link with a docking station. The communication link may be established through a physical docking or through a virtual docking over a wireless network. The method includes establishing by the mobile hub device a communication link with a content service provider via the docking station. The docking station is connected to the content service provider via a communication network. The method includes authenticating by the mobile hub device, wherein the authentication establishes that the mobile hub device is permitted to receive content hosted by the content service provider. The method includes transmitting by the mobile hub device a request to download content hosted by the content service provider, wherein the request identifies the content. The method includes receiving by the mobile hub device via the docking station the content.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, and those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

FIGS. 1 through 6, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

According to disclosed embodiments, a mobile hub device and a docking station provides controlled delivery of digital multimedia data (also referred to as "content") from a content service provider. The docking station enables the mobile hub device to access a local area network (LAN) or a wide area network (WAN) such as the Internet. The mobile hub device functions to identify content service providers which permit the mobile hub device to receive content hosted by the content service providers and identify external devices which are permitted to download locally stored content from the mobile hub device. The mobile hub device is also configured to dock into the docking station for wired communications (e.g., network access) or power (or both), and/or to communicate wirelessly with the docking station.

Figure 1:
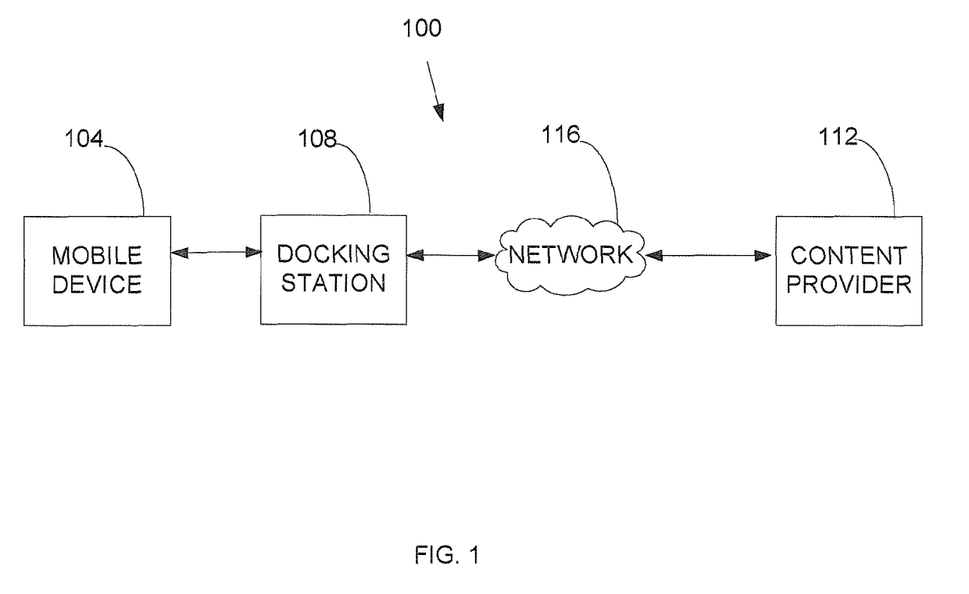
FIG. 1 illustrates a block diagram of a system according to disclosed embodiments.

FIG. 1 illustrates a system 100 for controlling and enabling delivery of content according to disclosed embodiments. As shown, the system 100 includes a mobile hub device 104 which may be configured as a mobile phone, a smart phone, a tablet, a personal digital assistant (PDA), a laptop computer or other handheld device.

According to disclosed embodiments, the mobile hub device 104 is configured to communicate with docking station 108 via a wired (i.e., docked or via cable) or a wireless link. Mobile hub device 104, for example, may be configured to slide into the docking station 108 and be directly coupled to the docking station 108 through a communication interface such as a universal serial bus (USB) or through an external cable link. Alternatively, the mobile hub device 104 may communicate with the docking station 108 via a wireless communication link such as Bluetooth, Wireless Fidelity (Wi-Fi), cellular, or visible light communication (VLC).

The docking station 108 is communicatively coupled to a content service provider 112 via a communication network 116 which may be a data, telecommunication and/or computer network, such as a wide area network (WAN) or a public network, such as the Internet. Further, the communication network 116 may be a wireless network, such as a cellular network, or configured as a combination of wired and wireless networks.

The content service provider 112 enables and allows the mobile hub device 104 to access and download hosted content. Prior to downloading any content, the mobile hub device 104 may perform an authentication process and may authenticate itself as an authorized device permitted to download content from the content service provider 112. In an embodiment, the mobile hub device 104 may perform authentication with the content service provider 112 using a unique cell identification number (CID) or other identifier associated with the mobile hub device 112. As will be appreciated, the Content service provider 112 may retain a list of authorized CIDs permitted to download content. The authentication process allows content service provider 112 to verify if mobile hub device 112 is authorized to receive the hosted content.

Figure 2:
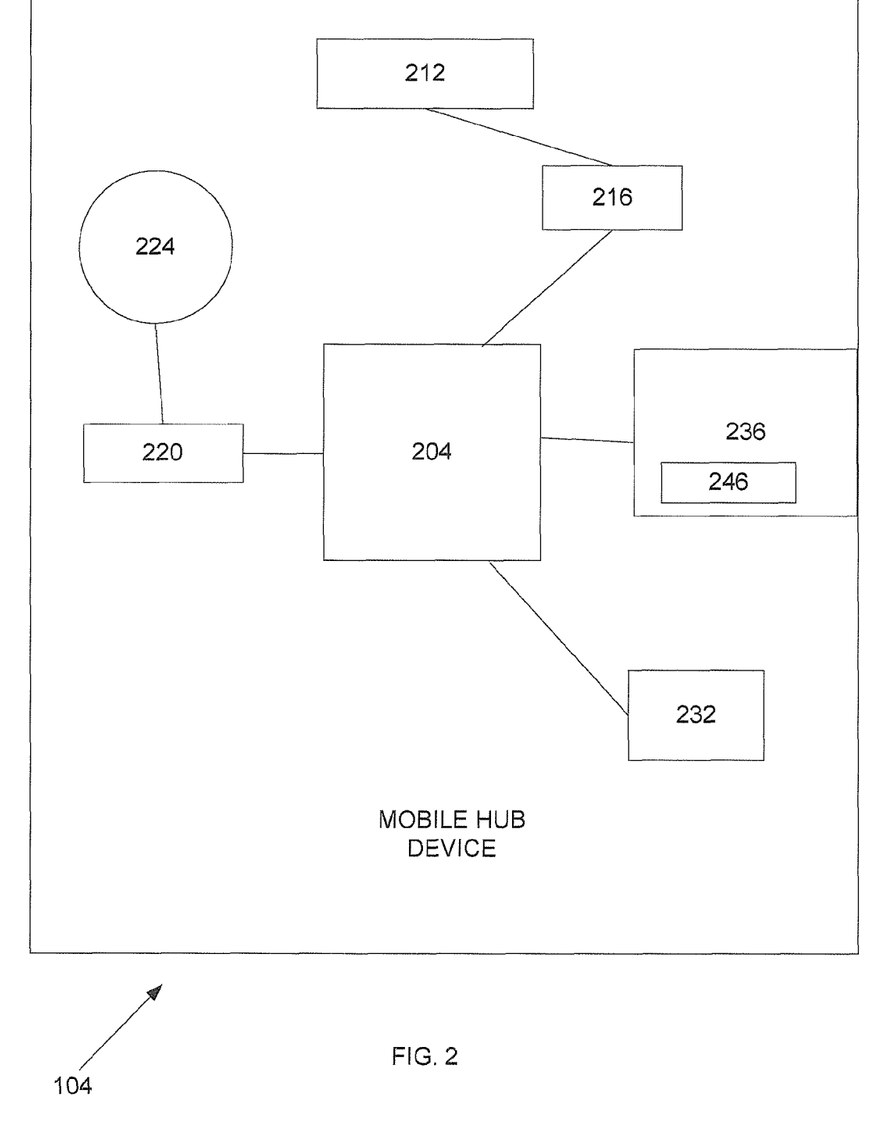
FIG. 2 illustrates a mobile hub device according to disclosed embodiments.

Now turning to FIG. 2, there is illustrated in more detail the mobile hub device 104 configured to transmit and receive content according to disclosed embodiments. The mobile hub device 104 includes a processor 204 (or controller) configured to control and operate the device 104 and other components therein. Processor 204 may, for example, be a RISC-type processor, such as an ARM processor, or a general processor, or other special-purpose processor, having the capabilities as described herein.

As previously noted, the mobile hub device 104 may download content hosted by the content service provider 112 via the docking station 108. Content is transmitted over the communication network 116 to the docking station 108 and then to the device 104. The content may be transmitted in data packets, such as audio, video or multimedia packets.

Processor 204 may send the video packets to a display driver 208 which converts the video packets into displayable video information that is forwarded to a display 212. The display 212 may be a liquid crystal display (LCD), a plasma display or any other suitable display. A touch-screen interface 216 may be provided with the display 212 to enable touch-screen capabilities.

In addition, the mobile hub device 104 may also receive audio packets which the processor 204 sends to a codec device 220. The codec device 220 converts audio packets into an audio signal which is sent to one or more audio speakers 224 to produce audible sound.

Mobile hub device 204 further includes memory 232 which may include both random access memory (RAM) and read only memory (ROM), and may be constructed of any suitable memory elements or type (e.g., flash, prom, hard disk, etc.). Software and/or firmware programs, operating systems, data, audio and video recordings, etc. may be stored in memory 232.

Mobile hub device 104 may also include one or more external interfaces, such as a High Definition Multimedia Interface (HDMI) 236 for transferring digital multimedia data to/from an HDMI-compliant device, or transferring other data or for external communications.

In one embodiment, the mobile hub device 104 may be a MiFi-enabled or WiFi-enabled device configured to connect to a MiFi or WiFi access device. It will be appreciated that a MiFi access device may be a wireless router which acts as a mobile WiFi node (or hotspot) for providing Internet access (or other communication capabilities) to multiple devices. According to some disclosed embodiments, the docking station 108 may function as a mobile WiFi access node which allows mobile hub device 104 to wirelessly connect to docking station 108 for Internet access (or other communication capabilities). The mobile hub device 104 may have 3G, 4G or other telecommunication or wireless interface standards capabilities.

In one embodiment, the mobile hub device 104 includes functionality enabling an external device to download locally stored content. For example, the mobile hub device 104 may dock into docking station 108 and establish a communication link with a second mobile hub device (not shown in the FIGURES). The second mobile hub device may authenticate itself as a device permitted to retrieve content stored in the mobile hub device 104. For example, the second mobile hub device may authenticate itself using a unique CID. Mobile hub device 104 may retain a list of authorized CIDs, thus allowing mobile hub device 104 to verify if the second mobile hub device is permitted to download locally stored content. Upon authentication, the mobile hub device 104 may transmit locally stored content to the second mobile hub device via docking station 108.

The mobile hub device 104 further includes a scheduling application 246 stored in memory 232. Scheduling application 246 allows the mobile hub device 104 to schedule and control downloading content from the content service provider 112. Also, the scheduling application 246 allows mobile hub device 104 to schedule and control redistribution of locally stored content to other mobile hub devices (not shown). For example, the scheduling application 246 may allow mobile hub device 104 to schedule downloading of content from the content service provider 112 based on network congestion and usage data.

Figure 3:
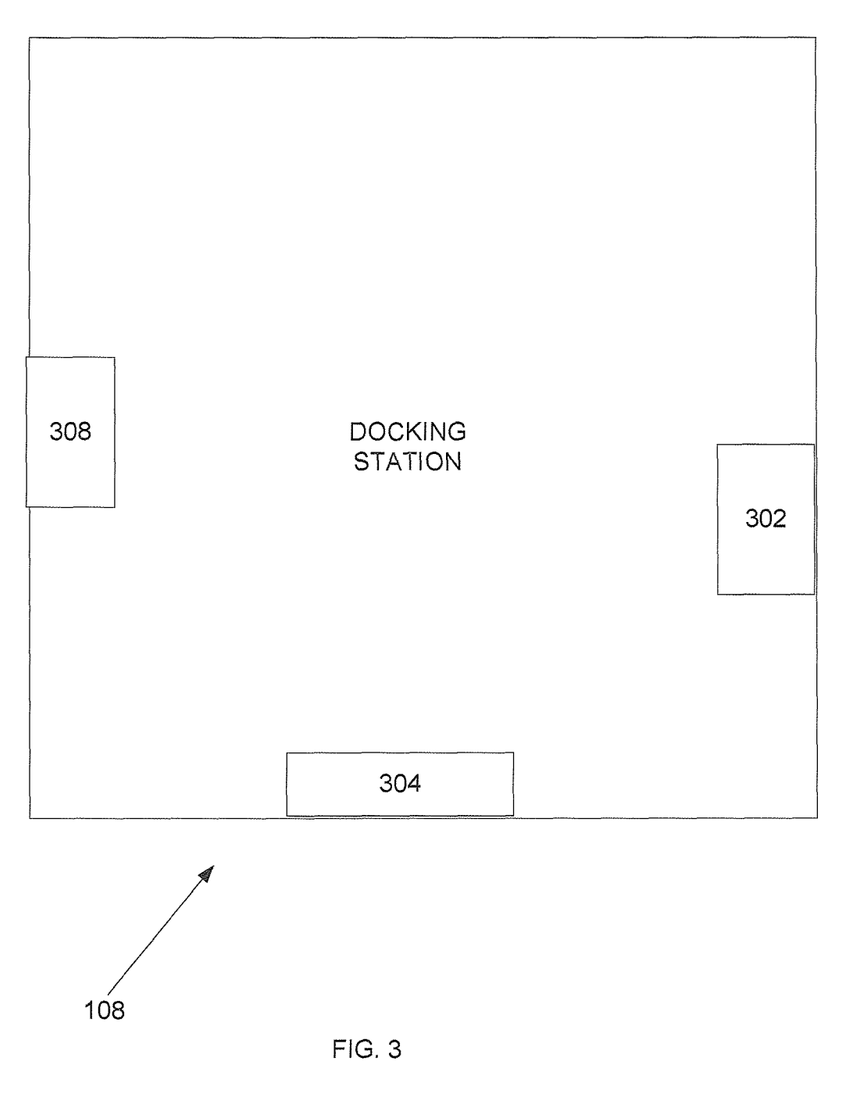
FIG. 3 illustrates a docking station according to disclosed embodiments.

Now turning to FIG. 3, there is illustrated a more detailed diagram of the docking station 108 according to disclosed embodiments. The docking station 108 is configured to and allows the mobile hub device 104 to dock into the docking station 108 for communication and/or power. According to one embodiment, the docking station 108 has a slot 304 configured to receive a mobile hub device 104. Mobile hub device 104, for example, may slide into slot 304, which provides a housing for the mobile hub device 104 in such a way that when in place within the slot 304, it establishes an interface connection between the mobile hub device 104 and docking station 108 for communication, power, or both. Thus, rechargeable batteries (not shown) within the mobile hub device 104 may be recharged and/or power may be provided to operate the mobile device 104. In one embodiment, the slot 304 and the mobile hub device 104 each include a USB interface, or other suitable interface(s).

According to disclosed embodiments, the docking station 108 provides the mobile hub device 104 with a LAN or WAN interface 302 (e.g., wired or wireless between the device and docking station) enabling the mobile hub device 104 to access the Internet or other communication networks. An HDMI 308 provides the mobile hub device 104 with an interface for connection to any external device having such an interface, such as for example, a television. The docking station 108 may also provide the mobile hub device 104 with an Ethernet connection, thereby enabling the mobile hub device 104 to communicate with other devices. The docking station 108 may also provide a remote control interface which enables a user to configure the mobile hub device 104 with a remote control device or a laptop. The docking station 108 also includes functionality and components to facilitate communication with other docking stations (not shown) over the network 116, thus enabling sharing and redistribution of content among a plurality of mobile hub devices 104.

Figure 4:
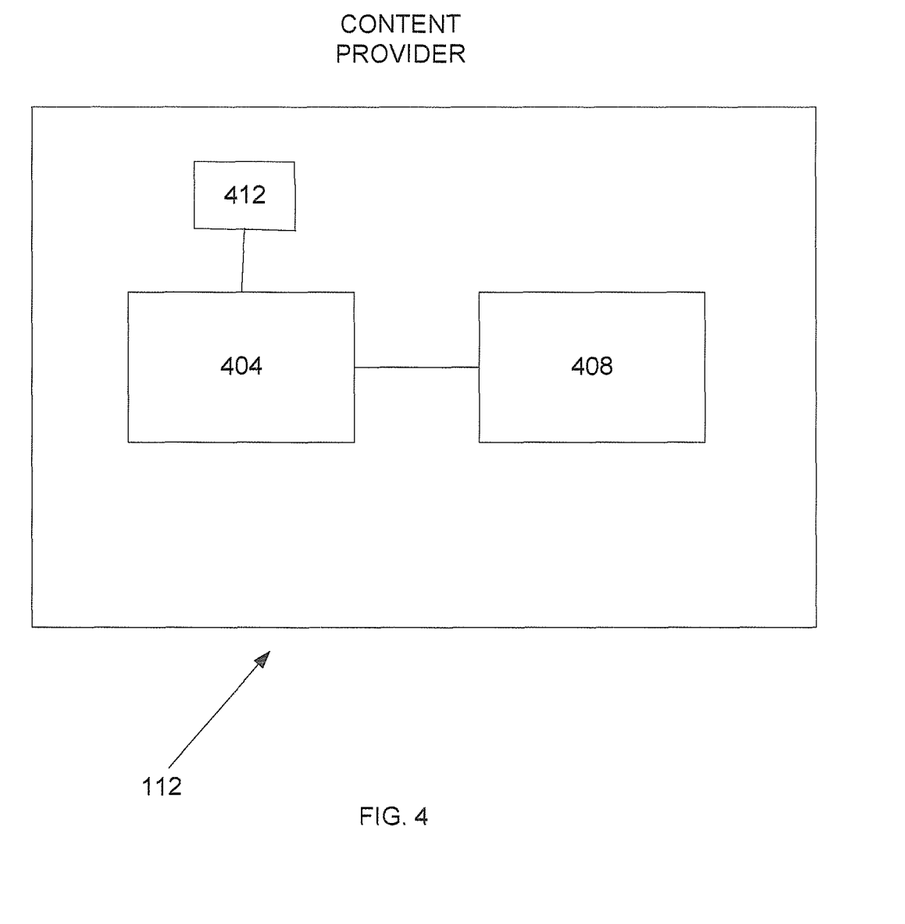
FIG. 4 illustrates a content service provider according to disclosed embodiments.

FIG. 4 illustrates a content service provider 112 according to disclosed embodiments. Content service provider 112 includes a storage server 404 configured for storing content, and may be coupled with a web server 408 for interfacing with the which provides an interface to the communication network 116. Web server 408 may control access to the storage server 404 and delivery of content from the storage server 404.

As discussed before, the content service provider 112 provides the mobile hub device 104 access to hosted content. The hosted content may be purchased or rented by a user via the mobile hub device 104. Some or all of the hosted content may be provided by the content service provider 112, and/or some or all of the content may be content hosted or owned by other parties or devices. In one example, the content service provider 112 may access (or provide access to) other service providers such as, for example, Amazon.com, Best Buy, Netflix for downloading and hosting content available to the mobile hub device 104. It will be understood that the content service provider 112 may also host/store personal content which may be defined as user-owned content which is hosted/stored by the content service provider 112.

With reference to FIG. 4, the content service provider 112 may include a content usage and download application 412 which implements one or more content download and usage policies—functions to restrict usage and content download. For example, the application 412 may implement (1) a content usage policy which sets a duration within which the mobile hub device 104 may use the downloaded content, (2) a content distribution policy which controls the time period or timing when content may be downloaded. This may include the application 412 restricting or providing certain content may be downloaded when network congestion is a minimum or meets some other criteria, and may schedule distribution of content to multiple mobile hub devices 104 based on time and network availability. Other restrictions may be implemented for content usage and downloading.

Figure 5:
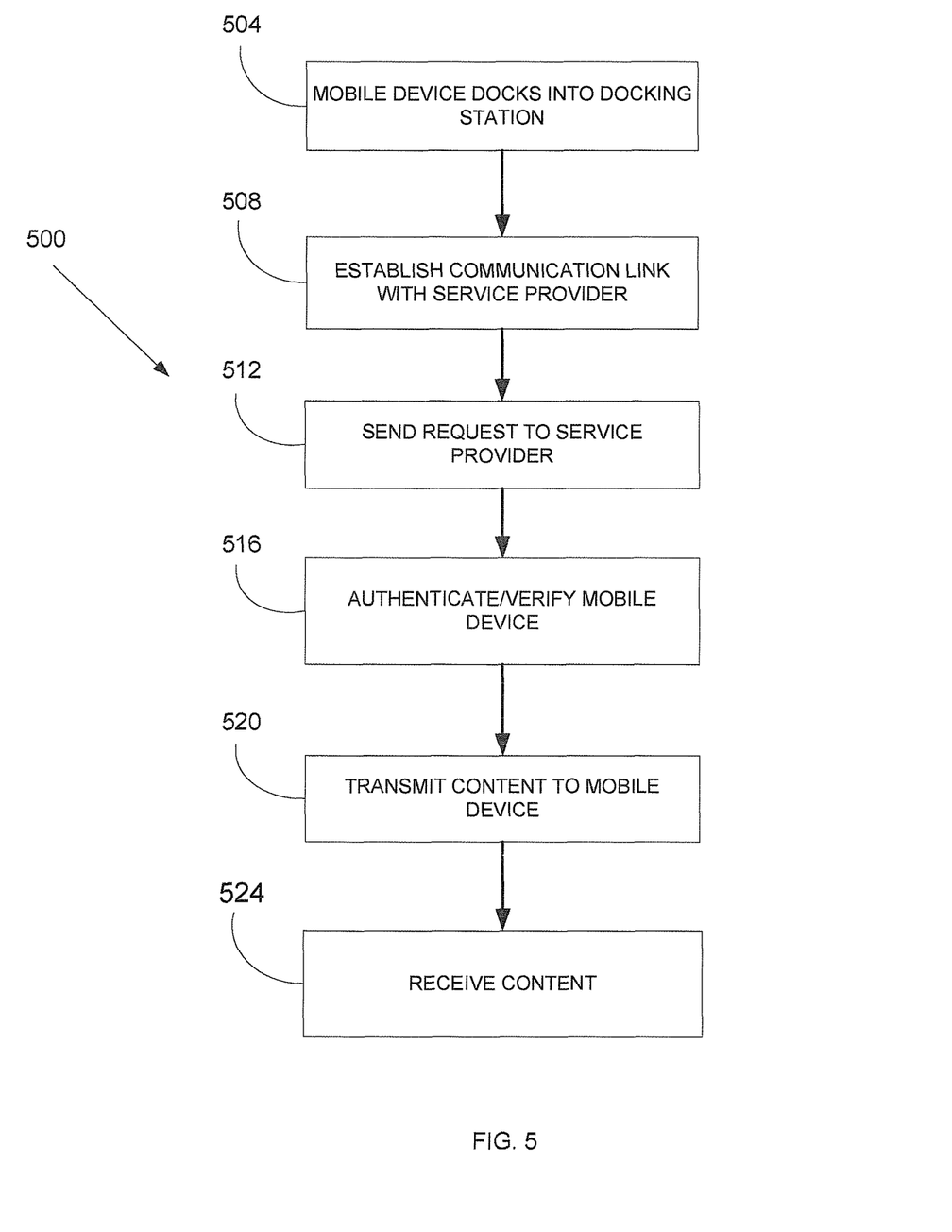
FIG. 5 illustrates a process for downloading content by a mobile hub device according to disclosed embodiments.

Now turning to FIG. 5, there is shown a process 500 for delivering content to the mobile hub device 104 according to one embodiment. In this example, the process 500 may be implemented by the system 100.

The mobile hub device 104 docks or links with the docking station 108 establishing a communications link between the docking station 108 and the device 104 (step 504). As will be understood, the communications link may be established by (1) physical docking between the device 104 and the station 108, (2) use of external cabling between the device 104 and the station 108 (e.g., a USB cable), and/or (3) a wireless interface between the device 104 and the station 108. Through this communication link, the device 104 may access the network 116 through the station 108, and via the network 116 may access other networks and the internet. Though not shown, an initial authentication process may also be performed to authenticate the mobile hub device 104 to the station 108.

Next, the mobile hub device 102 establishes a communication link with the content service provider 112 over the network 116 (step 508). Once the communication link with the station 108 is established (or as part of the step 508), the mobile hub device 104 sends a request to the content service provider 112 to download content (step 512). The request may identify the content (e.g., video files, audio files, text files) which the mobile hub device 104 desires to download.

An authentication process is performed authenticate or verify the mobile hub device is permitted to download content from the content service provider 112 (step 516). For example, the mobile hub device 104 may be authenticated by sending content service provider 112 a unique CID associated with mobile hub device 104 (and the CID is determined by the provider 112 that the associated device 104 has permission). Alternatively, the authentication process may be performed prior to the device 104 sending a request to the provider 112 (or during establishment of communications with the provider 112). In addition to general authorization, the content service provider 112 may verify whether there are any applicable licenses or restrictions associated with distribution of the specific requested content (and whether the mobile hub device 104 possesses any such required licenses or authority).

Once authenticated and authorized, the content service provider transmits (downloads) the requested content to the mobile hub device 104 via the network 116 (step 520). As will be appreciated, the transmitted content may be delivered in accordance with content delivery and usage policy (as described above) (step 524). The mobile hub device 104 receives the transmitted content (in accordance with any content delivery policy), and/or it may stored locally (and later used in accordance with any content usage policy).

Figure 6:
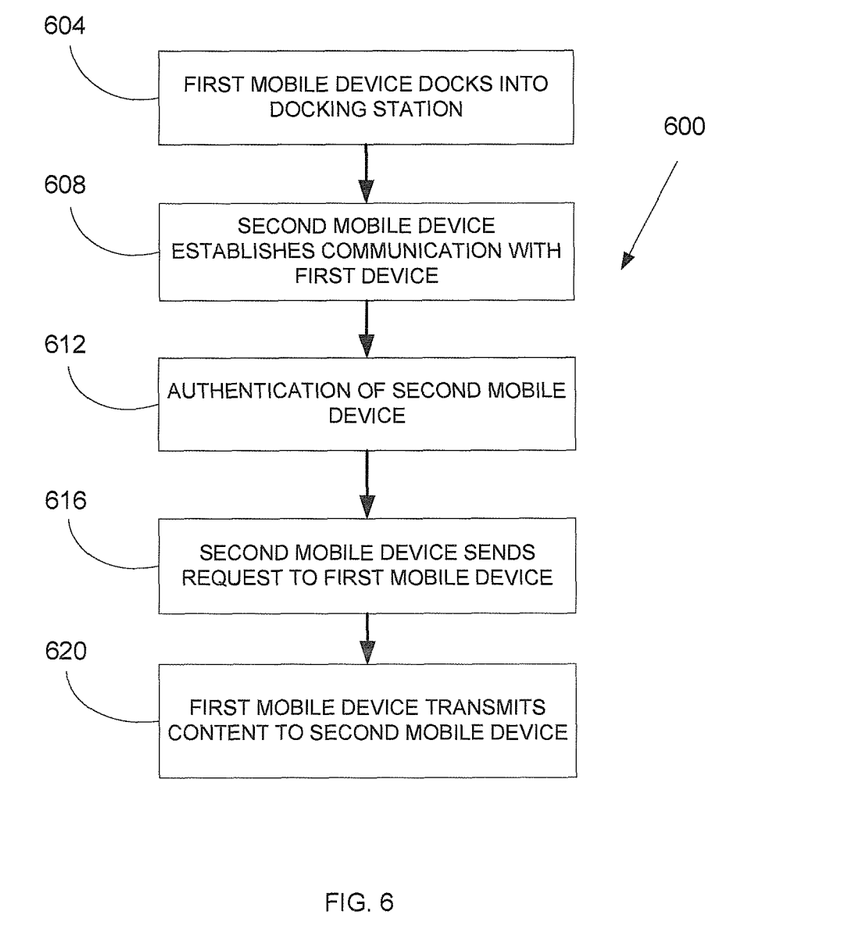
FIG. 6 illustrates a process for transmission of content by a first mobile hub device to a second mobile hub device according to disclosed embodiments.

Now turning to FIG. 6, there is shown a process 600 for transmitting content from a first mobile hub device 104*a* to a second mobile hub device 104*b*. For example, the process 600 may be implemented by system 100.

As discussed before, the mobile hub device 104 may distribute locally stored content to other devices via a docking station. The content, while stored on the mobile hub device, may be subject to usage restrictions which may be verified by either the first mobile hub device, the original source, or some other device (covering multiple mobile devices transferring data between them). In addition, the format of the content (e.g., data) may be modified to better suit the operational environment. For example, the size of the data may be reduced to lower data charges or to reduce download time. Also, aspect ratios of the data may be changed to better suit the receiving device. Also, a video compressor may be converted to a different compressor if various codecs are not supported equally.

As shown, the first mobile hub device 104a docks or links with the docking station 108 (step 604). As described previously, the docking station 108 provides an interface which allows the first mobile hub device 104a to access the communication network 116 (and other networks coupled to network 116, such as the Internet).

In block 608, the second mobile hub device establishes a communication link with the first mobile hub device over the Internet and via the docking station. In block 612, the second mobile hub device authenticates itself as an authorized device permitted to download content from the first mobile hub device. In block 616, the second mobile hub device sends a request to the first mobile hub device identifying the particular content the second mobile hub device wants to download. If the second hub device satisfies any licenses or restrictions that may be associated with the content, in block 616, the first mobile hub device transmits the content to the second mobile hub device via the docking station.

According to disclosed embodiments, a mobile device may permanently be docked with the docking station, providing the ability for the docking station to store data, distribute data, convert data, or perform any other function typically performed by the mobile device.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other products shown or discussed as directly coupled or communicating with each other may be coupled through some interface or device, such that the products may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

It should be understood that although an exemplary implementation of one embodiment of the present disclosure is illustrated above, the present system may be implemented using any number of techniques, whether currently known or in existence. The present disclosure should in no way be limited to the exemplary implementations, drawings, and techniques illustrated above, including the exemplary design and implementation illustrated and described herein, but may be modified within the scope of the appended claims along with their full scope of equivalents.

What is claimed is:

1. A mobile hub device, comprising:
    a transceiver configured to receive and transmit digital multimedia data over a first communication link;
    a storage device configured to store the multimedia data; and
    a processor operably coupled to the storage device, the processor configured to:
        identify a content provider which permits the mobile hub device to download multimedia data hosted by the content provider;
        identify one or more external devices permitted to receive the multimedia data from the mobile hub device; and
        schedule delivery of the multimedia data from the content provider to the mobile hub device and schedule delivery of the multimedia data from the mobile hub device to the external devices,
    wherein the transceiver is configured to transfer the multimedia data over a second communication link.

2. The mobile hub device of claim 1, wherein the first communications link is an IP network.

3. The mobile hub device of claim 1, wherein the second communications link is a cellular network.

4. The mobile hub device of claim 3, wherein a docking station establishes a communication link between a television and the mobile hub device.

5. The mobile hub device of claim 1, wherein the multimedia data is video.

6. The mobile hub device of claim 5, wherein the mobile hub device modifies the video to a different compression format.

7. The mobile hub device of claim 6, wherein the compression format is modified to optimize data transfer.

8. The mobile hub device of claim 6, wherein the compression format is optimized for the end device.

9. The mobile hub device of claim 1, wherein scheduling of the multimedia data download is made to minimize data charges.

10. The mobile hub device of claim 1, wherein a docking station provides an interface to the Internet.

11. The mobile hub device of claim 1, wherein the second communication link is a mobile WiFi (MiFi) link.

12. The mobile hub device of claim 1, further comprising an HDMI configured to establish a wired communication link between the mobile hub device and a television.

13. The mobile hub device of claim 1, further comprising a battery configured to provide electrical power to the mobile hub device, wherein the battery is recharged when the mobile hub device is docked into a docking station.

14. The mobile hub device of claim 1, wherein the scheduling of the multimedia data download is made during low network utilization.

15. A mobile hub device configured to access a local area network via a docking station, the mobile hub device comprising:
    a transceiver configured to receive and transmit digital multimedia data over a wireless communication link;
    a storage device configured to store the multimedia data; and
    a processor operably coupled to the storage device, the processor configured to:
        identify a content provider which permits the mobile hub device to download hosted multimedia data via the docking station;
        identify one or more external devices permitted to receive the multimedia data from the mobile hub device via the docking station;
        schedule transmission of the multimedia data from the content provider to the mobile hub device via the docking station; and schedule transmission of the multimedia data form the mobile hub device to the external devices via the docking station.

16. The mobile hub device of claim 15, further comprising WIFI interface used to transfer the multimedia data between the mobile hub device and the docking station.

17. The mobile hub device of claim 15, further comprising a universal serial bus (USB) configured to transfer the multimedia data between the mobile hub device and the docking station.

18. The mobile hub device of claim 15, further comprising a battery configured to provide electrical power to the mobile hub device, wherein the battery is recharged when the mobile hub device is docket into the docking station.

19. The mobile hub device of claim 15, wherein the docking station connects the mobile hub device to the Internet.

20. The mobile hub device of claim 15, wherein the docking station establishes a MiFi link with the mobile hub device.

21. A method for downloading digital multimedia data by a mobile hub device, the method comprising:
  establishing by the mobile hub device a communication link with a docking station;
  identifying by the mobile hub a content service provider which permits the mobile hub device to download multimedia data hosted by the content provider;
  establishing by the mobile hub device a communication link with the content service provider via the docking station, wherein the docking station is connected to the content service provider via a communication network;
  authenticating by the mobile hub device, wherein the authentication establishes that the mobile hub device is permitted to receive content hosted by the content service provider;
  transmitting by the mobile hub device a request to download content hosted by the content service provider, the request identifying the content;
  receiving by the mobile hub device the content; and
  identifying by the mobile hub device one or more external devices permitted to receive the multimedia data from the mobile hub device.

22. The method of claim 21, further comprising storing the content in a memory.

23. The method of claim 21, further comprising establishing a wireless communication link between the docking station and the mobile hub device.

24. The method of claim 21, further comprising establishing a wired communication link between the docking station and the mobile hub device with a universal serial bus (USB).

25. The method of claim 21, wherein the docking station provides an interface to the Internet.

26. The method of claim 21, wherein the communication link is a mobile WiFi (MiFi) link.

27. The method of claim 26, wherein a High Definition Multimedia Interface (HDMI) is configured to establish a wired communication link between the mobile hub device and a television.

28. The method of claim 21, wherein the mobile hub device is recharged when it is docked into the docking station.

29. A non-transitory computer-readable medium encoded with computer-executable instructions for downloading digital multimedia data by a mobile hub device, wherein the computer-executable instructions when executed cause the mobile hub device to:
  establish a communication link with a docking station;
  identify a content service provider which permits the mobile hub device to download multimedia data hosted by the content provider;
  establish a communication link with the content service provider via the docking station, wherein the docking station is connected to the content service provider via a communication network;
  authenticate the mobile hub device, wherein the authentication establishes that the mobile hub device is permitted to receive content hosted by the content service provider;
  transmit a request to download content hosted by the content service provider, the request identifying the content;
  receive via the docking station the content; and
  identify one or more external devices permitted to receive the multimedia data from the mobile hub device.

30. The non-transitory computer-readable medium of claim 29, wherein the received content is stored in a memory.

31. The non-transitory computer-readable medium of claim 29, wherein the docking station provides the mobile hub device an interface to a local area network (LAN).

32. The non-transitory computer-readable medium of claim 29, wherein the docking station provides the mobile hub device an interface to the Internet.

* * * * *